Aug. 2, 1927.

P. D. EGAN 1,637,988

SIGN

Filed Sept. 12, 1925  2 Sheets-Sheet 1

Aug. 2, 1927.
P. D. EGAN
SIGN
Filed Sept. 12, 1925

P. D. Egan,
INVENTOR

BY Victor J. Evans
ATTORNEY

WITNESS:

Patented Aug. 2, 1927.

1,637,988

UNITED STATES PATENT OFFICE.

PATRICK D. EGAN, OF FORT SMITH, ARKANSAS.

SIGN.

Application filed September 12, 1925. Serial No. 56,068.

This invention relates to a sign, the general object of the invention being to provide means for revolving the sign so that the various parts thereof will be brought into view, attention attracted to the same, with means for illuminating the sign parts.

Another object of the invention is to so form the sign that it can be made in various shapes to indicate the nature of the articles or objects being advertised.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 5 is a sectional view through a modification.

Figure 6 is a section on line 6—6 of Figure 5.

Figure 1:
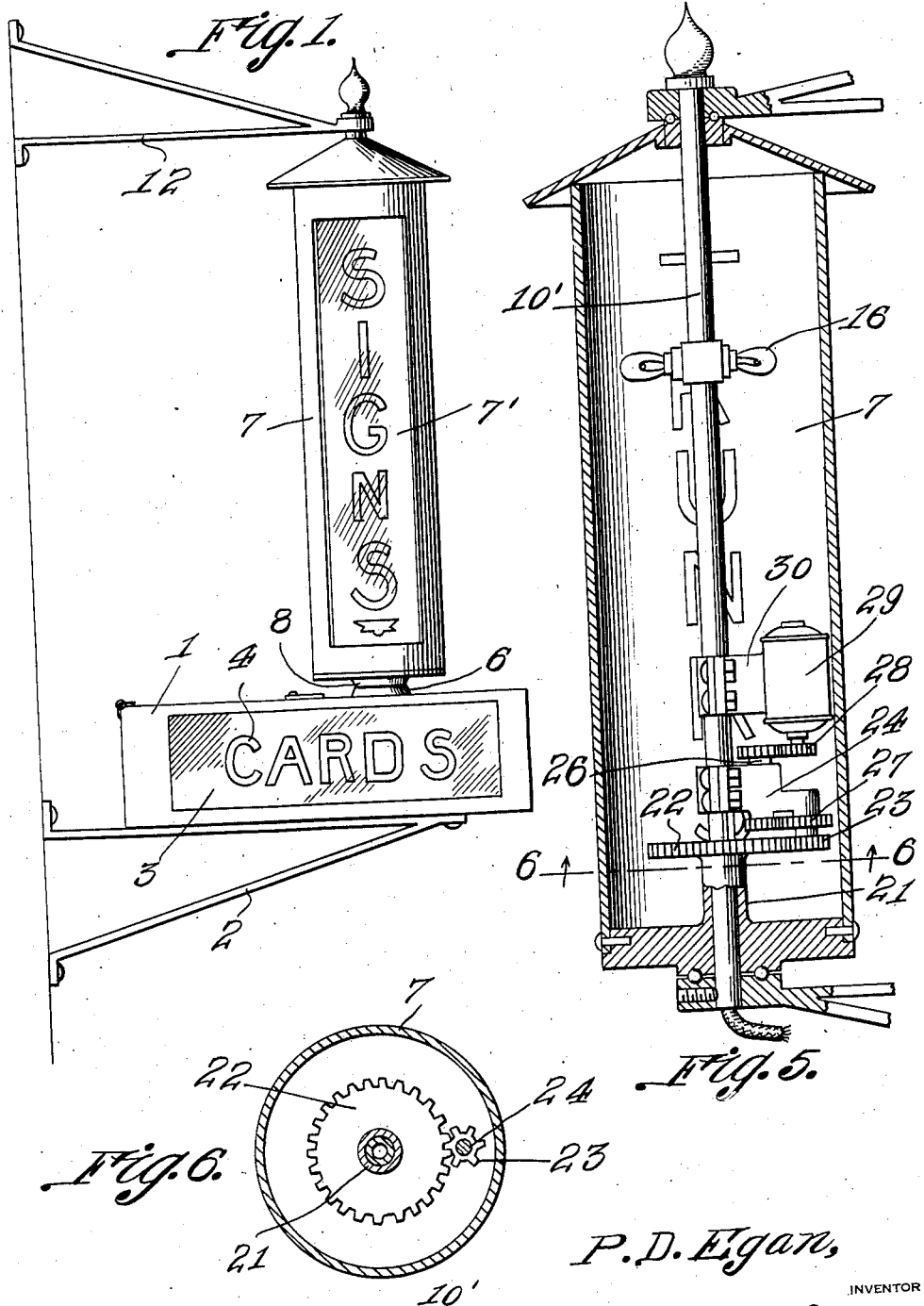
Figure 1 is a side elevation of one form of the invention.
Figure 2:
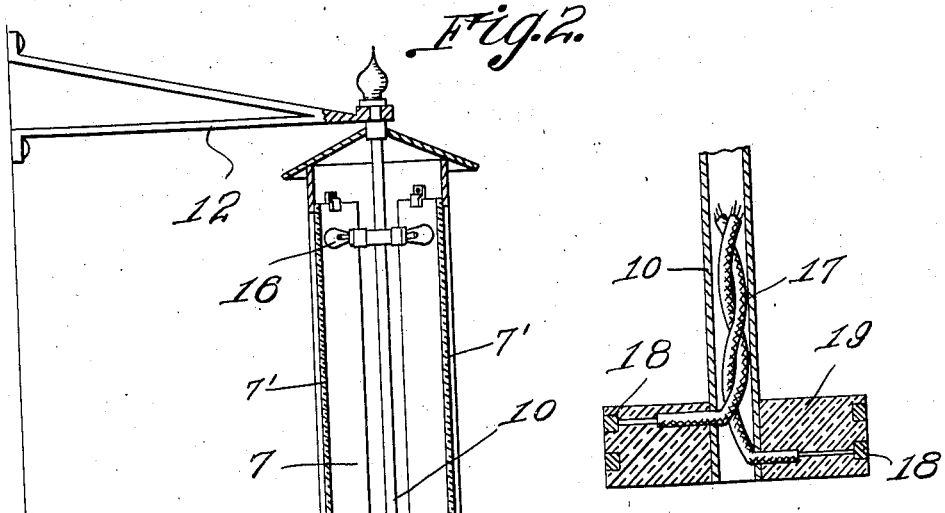
Figure 2 is a longitudinal sectional view through Figure 1.
Figure 4:
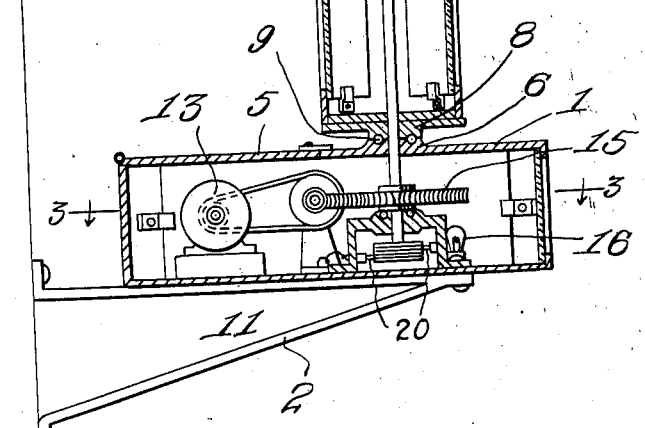
Figure 4 is a sectional detail view, showing the conductor means entering the shaft.
Figure 3:
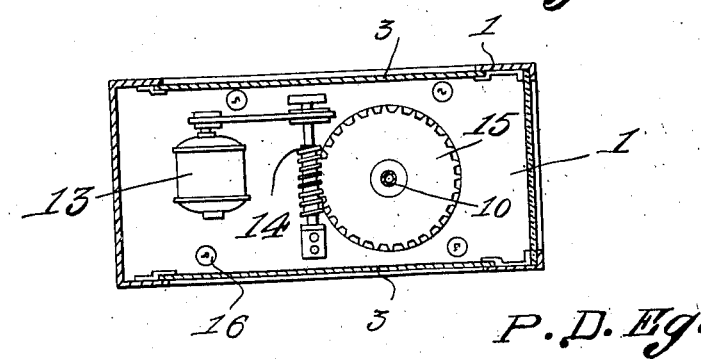
Figure 3 is a section on line 3—3 of Figure 2.

In these views, 1 indicates a casing which is supported by the bracket 2 and which is provided with the transparent portions 3 which contain advertising matter or the like, as shown at 4 in Figure 1. This casing is provided with a door 5, so that access to the interior thereof can be had. The top of the casing is provided with a boss 6 and a vertically arranged casing 7 has a boss 8 on its bottom, which rests upon the boss 6, ball bearings 9 being placed between the two bosses. A tubular shaft 10 passes through the casing 7 and the two bosses and is journaled in bracket 11 in the casing 1, and has its upper end journaled in a bracket 12 which is similar to the bracket 2. A motor 13 is arranged in the casing 1 and said motor drives a worm shaft 14 arranged in the casing, the worm of which meshes with a gear 15 on the shaft 10. The shaft 10 is fastened to the casing 7 so that the casing will revolve on casing 1 when the motor is in operation. Lamps 16 are arranged in both casings and the conductors 17 for the lamps in casing 7 pass through the tubular shaft 10 and have their lower ends connected with rings 18 carried by a block 19 of insulating material on the lower end of the shaft 10, these rings being engaged by brushes 20 carried by the bracket and connected with the circuit of the device. The casing 7 is provided with transparent sign members 7'.

From the foregoing, it will be seen that the casing 7 will rotate upon the casing 1 when the motor 13 is in operation, so that the various signs on the casing 7 will be brought to the front thereof and the movement of this casing will act to attract attention to the device. The signs can be changed by substituting transparent members with the new signs thereon for the old ones, and the casing 7 may be made in various shapes. For instance, the sign for a coffee shop might be made to resemble a coffee urn, a sign for a plumber might be made to resemble a tank, while a sign for a druggist might be made in the shape of a bottle.

The lamp circuits should be provided with a switch, so that the switch can be opened during the day and only closed at night, while the motor circuit would operate both day and night, if desired.

In the modification shown in Figures 5 and 6, the vertical casing is supported directly by the brackets, as the horizontal casing is omitted. The shaft 10' is stationary and is fastened to the brackets. The bottom of the casing is provided with an interior tubular part 21 which has a gear 22 attached to its upper end and through which the shaft 10' passes. A gear 23 is carried by a stub shaft 24 journaled in a bracket 25 secured to the shaft 10' and in which is journaled a second shaft 26 which is geared to the shaft 24, as shown at 27, and which is connected by the gears 28 to the shaft of a motor 29 which is supported by the bracket 30 from the shaft 10'. Thus in this modified form of the invention, the motor and its gears are arranged in the casing, the casing rotating on the stationary shaft 10'.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination, a pair of spaced superimposed brackets, an elongated horizontally disposed casing supported upon the lower bracket, a vertically disposed casing rotatably mounted upon the first mentioned casing and positioned between the latter and the uppermost bracket, each of said casings having transparent walls, a shaft arranged centrally within the vertical casing, and journaled in the uppermost bracket, a bearing for said shaft arranged in the first mentioned casing, an electric motor positioned in the last mentioned casing, a gear carried by said shaft and rotated from said motor, lamps arranged in said casings and included in circuits, a rotary insulating member carried by the shaft and operating within the bearing therefor, rings carried by said member and electrically connected with said lamps, and brushes carried by the bearing and contacting said rings.

2. In combination, a horizontally disposed elongated casing, means for supporting it adjacent a vertical wall, a horizontal bracket secured to said wall above the casing, and spaced therefrom, a vertically disposed casing rotatably mounted upon the horizontal casing and positioned between the latter and the bracket, display matter in the walls of the upper casing, a shaft arranged centrally within the vertical casing and journaled in the bracket, a bearing for said shaft arranged in the lower casing, an electric motor positioned in the last mentioned casing, a gear carried by said shaft and rotated from said motor, lamps arranged in the upper casing and included in a circuit, a rotary insulating member carried by the shaft and operating within the lower casing, rings carried by said member and electrically connected with said lamps, and brushes supported in contact with said rings and electrically connected with a current supply.

In testimony whereof I affix my signature.

PATRICK D. EGAN.